United States Patent
DeWitte et al.

(10) Patent No.: US 10,692,611 B2
(45) Date of Patent: Jun. 23, 2020

(54) PASSIVE INHERENT REACTIVITY COEFFICIENT CONTROL IN NUCLEAR REACTORS

(71) Applicant: Oklo Inc., Mountain View, CA (US)

(72) Inventors: Jacob DeWitte, Mountain View, CA (US); Joshua G. Richard, Mountain View, CA (US)

(73) Assignee: Oklo, Inc., Mountain View, CA (US)

( * ) Notice: Subject to any disclaimer, the term of this patent is extended or adjusted under 35 U.S.C. 154(b) by 81 days.

(21) Appl. No.: 15/444,265

(22) Filed: Feb. 27, 2017

(65) Prior Publication Data

US 2017/0249999 A1 Aug. 31, 2017

Related U.S. Application Data

(60) Provisional application No. 62/300,744, filed on Feb. 26, 2016.

(51) Int. Cl.
| | |
|---|---|
| *G21C 5/12* | (2006.01) |
| *G21C 7/02* | (2006.01) |
| *G21C 5/02* | (2006.01) |
| G21C 3/322 | (2006.01) |
| G21C 7/24 | (2006.01) |
| G21C 3/42 | (2006.01) |

(52) U.S. Cl.
CPC .............. *G21C 5/12* (2013.01); *G21C 5/02* (2013.01); *G21C 7/02* (2013.01); *G21C 3/322* (2013.01); *G21C 3/42* (2013.01); *G21C 7/24* (2013.01); *Y02E 30/39* (2013.01)

(58) Field of Classification Search
CPC ... G21C 5/12; G21C 5/02; G21C 7/02; G21C 7/24; G21C 3/42; G21C 3/322

USPC .......................................................... 376/339
See application file for complete search history.

(56) References Cited

U.S. PATENT DOCUMENTS

| | | | |
|---|---|---|---|
| 3,043,727 A | 7/1962 | Elliott et al. | |
| 3,205,139 A | 9/1965 | Stewart et al. | |
| 3,257,285 A | 6/1966 | Clifford et al. | |
| 3,276,965 A * | 10/1966 | Leyse | G21C 7/22 |
| | | | 376/339 |
| 3,960,655 A | 6/1976 | Bohanan et al. | |

(Continued)

OTHER PUBLICATIONS

International Search Report and Written Opinion dated Oct. 5, 2017, for PCT/US17/19780.

*Primary Examiner* — Jack W Keith
*Assistant Examiner* — Daniel Wasil
(74) *Attorney, Agent, or Firm* — Pillsbury Winthrop Shaw Pittman LLP (57) ABSTRACT

System and methods are disclosed for controlling a nuclear reactor that uses fuel having plutonium-239. The nuclear reactor includes a neutron moderator, such as $ZrH_{1.6}$, which behaves as an Einstein oscillator and increases the energy of thermal neutrons into the Pu-239 neutron absorption resonance as the temperature of the nuclear reactor increases. A neutron absorbing element with neutron absorption around 0.3 eV is added to the nuclear reactor to suppress any reactivity gain that can occur due to the increase in temperature. The amount of the neutron absorbing element to be added to the nuclear reactor is calculated such that the reactivity gain that may occur at any time during the life of the fuel is suppressed.

16 Claims, 11 Drawing Sheets

(56) References Cited

U.S. PATENT DOCUMENTS

| | | | |
|---|---|---|---|
| 3,969,631 A * | 7/1976 | Winsche | G21G 1/06 |
| | | | 376/310 |
| 5,112,534 A | 5/1992 | Guon et al. | |
| 5,250,231 A * | 10/1993 | Grossman | G21C 7/04 |
| | | | 376/339 |
| 5,267,284 A | 11/1993 | Grossman | |
| 5,267,290 A | 11/1993 | Corsetti et al. | |
| 6,263,038 B1 | 7/2001 | Kantrowitz et al. | |
| 8,625,731 B2 | 1/2014 | Holden et al. | |
| 2008/0144762 A1 | 6/2008 | Holden et al. | |
| 2009/0268861 A1 | 10/2009 | Shayer | |
| 2010/0040189 A1 | 2/2010 | Brachet et al. | |
| 2010/0123107 A1 | 5/2010 | Johnson | |
| 2012/0219102 A1 | 8/2012 | Shayer | |
| 2013/0077731 A1 | 3/2013 | Sherwood et al. | |
| 2013/0083878 A1 * | 4/2013 | Massie | G21C 5/12 |
| | | | 376/359 |
| 2014/0226774 A1 | 8/2014 | Holden et al. | |

* cited by examiner

PASSIVE INHERENT REACTIVITY COEFFICIENT CONTROL IN NUCLEAR REACTORS

CROSS-REFERENCE TO RELATED APPLICATIONS

This application claims the benefit of U.S. Provisional Application No. 62/300,744 filed Feb. 26, 2016, incorporated by reference in its entirety herein.

FIELD OF THE INVENTION

The present invention relates generally to nuclear reactors, and more specifically to passive inherent reactivity coefficient control in nuclear reactors.

BACKGROUND

A major component of active nonproliferation programs is the disposition of stockpiles of both civilian-generated and military-generated plutonium. Destroying plutonium via fission in nuclear reactors is a preferable means to disposing of it. Furthermore, previously used nuclear fuel can be used as a feed fuel for a variety of nuclear reactor designs. The predominant fissile isotope in both consuming plutonium stockpiles and previously used fuel is plutonium 239 (Pu-239). Additionally, high-burnup fuels designed to maximize uranium utilization benefit from the consumption of plutonium generated in the fuel. There is a need for nuclear reactor designs that are optimized for safe and reliable use of fuels comprising Pu-239.

SUMMARY OF THE INVENTION

According to some embodiments, a nuclear reactor may comprise: fuel comprising plutonium-239; a neutron moderator, such as $ZrH_x$, where x can vary between 1 and 4, but is most often between 1.5 and 1.7, and is preferably about 1.6, $YH_2$, $TiH_2$ and/or $ThH_2$, which behaves as an Einstein oscillator and as the temperature of the reactor increases the moderator increases the energy of thermal neutrons into the Pu-239 neutron absorption resonance; and a neutron absorbing element with strong neutron absorption around 0.3 eV added to one or more components of a reactor core in the nuclear reactor, wherein said neutron absorbing element is provided in an amount calculated to suppress, at any time during the life of the fuel, a reactivity gain with temperature due to said neutron moderator increasing the energy of thermal neutrons into the Pu-239 neutron absorption resonance. Furthermore, in embodiments said Pu-239 may be present as 0.4 weight percent or more of the fuel, and in further embodiments as 0.1 to 1.0 percent, 1.0 to 5.0 percent, 5 percent to 10 percent, 10 percent to 20 percent, or 20 to 100 percent by weight of the fuel. Furthermore, in embodiments said neutron absorbing element has an absorption cross section of at least 100 barns, in some embodiments at least 500 barns and in further embodiments over 1000 barns. Furthermore, in embodiments said neutron absorbing element is Erbium.

According to some embodiments, a method of controlling a nuclear reactor may comprise: providing fuel comprising Pu-239; providing a neutron moderator, such as $ZrH_x$, where x can vary between 1 and 4, but is most often between 1.5 and 1.7, and is preferably about 1.6, $YH_2$, $TiH_2$ and/or $ThH_2$, which behaves as an Einstein oscillator and as the temperature of the reactor increases the moderator increases the energy of thermal neutrons into the Pu-239 neutron absorption resonance; and adding a neutron absorbing element with strong neutron absorption around 0.3 eV to one or more components of a reactor core in the nuclear reactor, wherein said neutron absorbing element is provided in an amount calculated to suppress, at any time during the life of the fuel, a reactivity gain with temperature due to said neutron moderator increasing the energy of thermal neutrons into the Pu-239 neutron absorption resonance.

According to some embodiments, a method of controlling a nuclear reactor may comprise: providing fuel comprising atomic elements that breed Pu-239; providing a neutron moderator, such as $ZrH_x$ where x can vary between 1 and 4, but is most often between 1.5 and 1.7, and is preferably about 1.6, $YH_2$, $TiH_2$ and/or $ThH_2$, which behaves as an Einstein oscillator and as the temperature of the reactor increases the moderator increases the energy of thermal neutrons into the Pu-239 neutron absorption resonance; and adding a neutron absorbing element with strong neutron absorption around 0.3 eV to one or more components in a reactor core of the nuclear reactor, wherein said neutron absorbing element is provided in an amount calculated to suppress or mitigate, at any time during the life of the fuel, a reactivity gain with temperature due to said neutron moderator increasing the energy of thermal neutrons into the Pu-239 neutron absorption resonance.

DETAILED DESCRIPTION

Embodiments of the present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

A major component of active nonproliferation programs is the disposition of stockpiles of both civilian-generated and military-generated plutonium. Destroying plutonium via fission in nuclear reactors is a preferable means to disposing of it. Furthermore, previously used nuclear fuel can be used as a feed fuel for a variety of nuclear reactor designs. The predominant fissile isotope in both consuming plutonium stockpiles and previously used fuel is plutonium 239 (Pu-239). Pu-239 has some unique characteristics in nuclear reactor environments, particularly in thermal and epithermal neutron reactors. Pu-239 has a distinct absorption resonance around 0.3 eV, which includes the fission resonance, that is significantly greater than the absorption cross section at neighboring neutron energy levels—as discussed below, the present inventor discovered that this absorption resonance has an unexpectedly strong effect on the stability of the reactor using certain moderators at relevant temperatures. This can pose certain design hurdles that must be accounted for when designing reactors to use plutonium based fuels.

One particular example is a solid state reactor moderated by $ZrH_x$ and $UZrH_x$. The x can vary between 1 and 4, but is most often between 1.5 and 1.7, and is preferably about 1.6 atoms of H to each atom of Zr, and herein ZrH will be used to describe the $ZrH_x$ with a range of H:Zr ratios. ZrH is a unique moderator with some peculiar properties. Of primary interest here is the Einstein oscillator phenomenon observed in ZrH that causes the H nuclei to oscillate at a certain frequency that varies with temperature. In general this limits the ability of ZrH to moderate neutrons to energies below 0.14 eV. Furthermore, the oscillators can speed neutrons up, especially as temperatures increase. This is particularly useful in reactor designs because it causes the neutron spectrum to "harden" out of thermal range when the moderator heats up, reducing reaction rates, and therefore shutting the reactor down. TRIGA type reactors harness this phenomenon to control pulsed operations.

Figure 1:
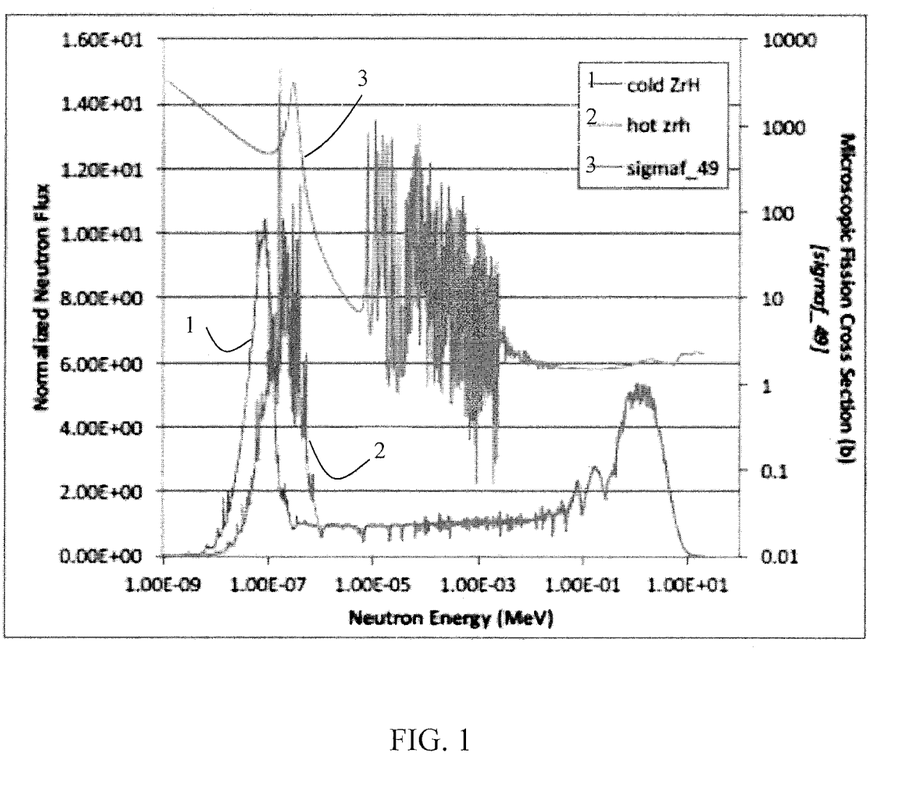
FIG. 1 is a comparison between neutron energy spectra at different temperatures and the energy dependent microscopic fission cross section of Pu-239 to illustrate spectral shift effects.

This effect poses challenges, however, to plutonium-fueled systems that were discovered by the present inventor while investigating the performance of ZrH moderated nuclear reactors for plutonium disposition. When temperatures increase, the ZrH helps the neutrons speed up into the Pu-239 resonance, introducing a significant reactivity gain, which is illustrated by FIG. 1. This manifests itself as a positive temperature coefficient that could lead to an uncontrollable chain reaction. The neutronic properties driving this phenomenon are summarized in Table 1. This effect was also confirmed in other types of nuclear reactors using ZrH, such as liquid metal cooled reactors, water cooled reactors, and molten salt reactors—see Examples provided below. Furthermore, other materials such as yttrium hydride, magnesium hydride, uranium hydride, thorium hydride, transition metal hydrides, etc., are expected to exhibit similar behavior to the ZrH, and if present in a reactor may require solutions such as described herein. A variety of solutions have been developed and evaluated to overcome this challenge, and are described below. These studies were informed by previous work on graphite moderated systems, in which a similar, but not as strong resonance effect has been observed due to the temperature shift of the Maxwell neutron spectrum; however, the effect of the Pu-239 resonance was found by the inventor to be unexpectedly strong due to the thermal up scattering effects when using an Einstein oscillator type moderator, such as ZrH, which at higher temperatures moderates neutrons into the Pu-239 absorption resonance energies. This is a unique effect for nuclear reactors that principally relies on moderators such as ZrH for moderation, so this effect can be insignificant or inconsequential in systems that combine ZrH and water for moderation. In this case, neutrons are moderated back below the Pu-239 resonance by the water. Note that a liquid salt cooled and fueled reactor with a ZrH moderator was modeled by the inventor with a Pu-239 weight concentration of only 0.4% net, 0.64% of the total actinide mass, and this small weight percent of Pu-239 is sufficient to produce a positive temperature coefficient, unless a suitable suppressant is used.

It is noted that Monte Carlo neutron transport analysis tools were used to model the phenomenon described above, simulating the behavior of reactors comprising Pu-239 fuel and ZrH moderator. Custom tools to develop raw thermal scattering cross section data into usable formats were developed and used to properly model these effects; these custom tools were benchmarked with related problems using proven tools. Furthermore, advances in the art of quantum computing will continue to improve the accuracy and generation of thermal scattering data.

TABLE 1

Comparison of various neutronic performance attributes at different temperatures.

|  | Delta | 800 K | 1200 K |
|---|---|---|---|
| $k_{eff}$ | 2.015% | 1.08398 | 1.10582 |
| U-238 Fission | −14.525% | 0.0337845 | 0.0288773 |
| U-235 Fission | −20.770% | 0.252459 | 0.200023 |
| Pu-239 Fission | 11.785% | 0.577861 | 0.645963 |
| Pu-241 Fission | −7.691% | 0.1322 | 0.122032 |
| Pu-239 Capture | 22.589% | 0.210563 | 0.258128 |
| U-238 Capture | −11.274% | 0.270686 | 0.240168 |
| Beta | −7.442% | 0.00404855 | 0.00374725 |
| Nu bar | 0.718% | 2.76731 | 2.78719 |

Several suitable solutions were found to alleviate this situation in ZrH-moderated reactors. Several elements have isotopes with absorption cross sections that overlap with the Pu-239 resonances in a way that enables them to outcompete Pu-239 for neutron absorption in those energy ranges, thereby preventing the runaway effect, and turning the temperature coefficient negative. The results from two design scenarios are provided in Table 2. Erbium was used in both a ZrH-moderated, liquid metal cooled reactor assembly shown in Scenario A, and a ZrH-moderated molten salt cooled reactor design in Scenario B. These materials have been used as burnable poisons in reactors, and can be embedded in the fuel, cladding, moderator, and/or structural material if need be. The versatility afforded by the capability to embed the absorber in any or all components of a reactor core enables it to be integrated economically and flexibly into reactor cores throughout the lifetime of the fuel. See examples of nuclear reactor configurations shown in FIGS. 3-11. The use of these materials, however, is not as burnable poisons which are being used to suppress excess reactivity at the beginning of core life and are subsequently "burned" off as they absorb neutrons and transmute to less absorbing isotopes. Instead, these materials must be present in sufficient quantity throughout the core's life to ensure the reactivity temperature coefficients remain negative. They are necessary for any design employing this fuel/moderator combination to have a negative temperature coefficient, and contribute to the inherent safety of the reactor. This is particularly important for systems that produce Pu-239 over their operational lifetime in sufficient quantities to contribute substantially to the overall fission rate.

TABLE 2

Comparison of Multiplication Factors for Different Temperatures with and without Reactivity Control Additives.

| Temp (K) | No Additive | ~1% Additive |
|---|---|---|
| Scenario A ($k_{inf}$) | | |
| 400 | 1.1989 | 0.9003 |
| 600 | 1.2375 | 0.9080 |
| 800 | 1.2433 | 0.8776 |
| 1200 | 1.3180 | 0.8146 |
| Scenario B ($k_{eff}$) | | |
| 600 | 1.116 | 0.943 |
| 800 | 1.1269 | 0.941 |
| 1200 | 1.142 | 0.9193 |

The following elements are some examples of promising candidates for passive reactivity suppression: naturally present elements such as Cd, Sm, Eu, Er and Lu; and fertile sources from which active suppressants can be bred in a neutron field, such as Gd, Ho and Ta.

Figure 2:
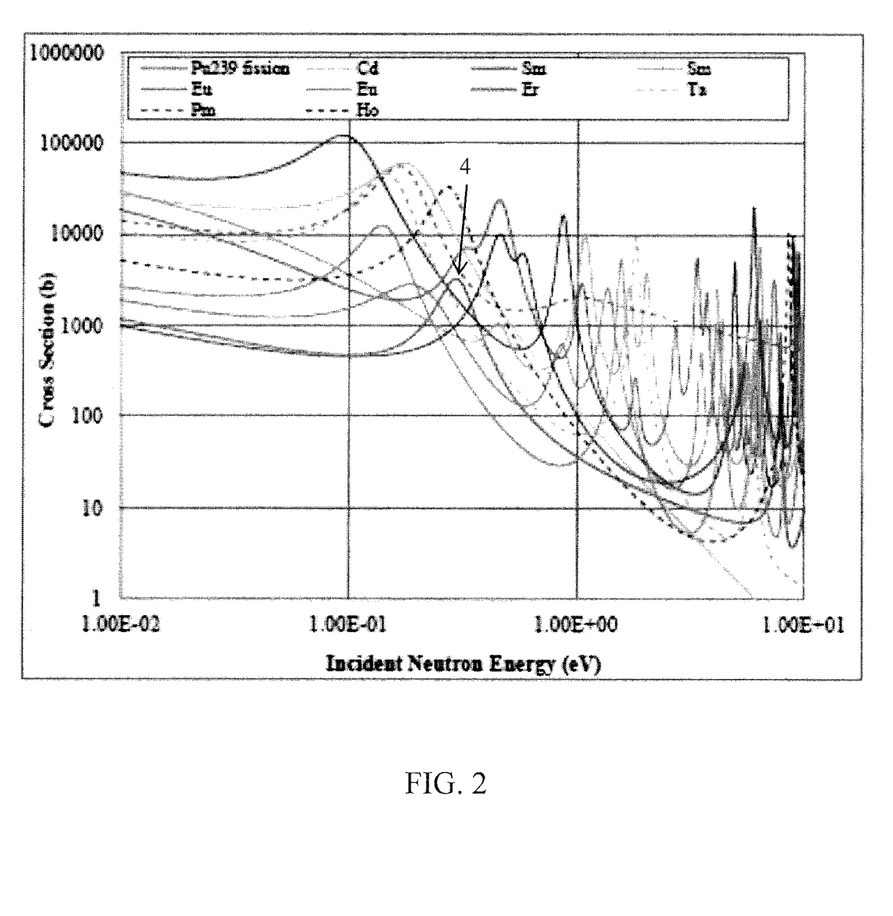
FIG. 2 shows cross section comparisons of various elements and isotopes in the Pu-239 resonance region.

FIG. 2 shows the absorption cross section behavior of several elements of interest compared to the Pu-239 fission cross section 4. These elements can be manufactured into a variety of materials suitable for use in a reactor environment employing nearly any conceivable fuel/moderator/coolant combination. For example, suitable materials containing erbium may include, but are not limited to: $ErH_3$, $Er_2O_3$, $ErF_3$, and Er metal. Other candidate elements can be made into equally diverse materials suitable for reactor environments.

According to some embodiments, the suppressants can be manufactured into any of the core constituents, such as the fuel, moderator, cladding, coolant, reflector, control rods, or structural elements. See examples of nuclear reactor configurations shown in FIGS. 3-11. The optimal configuration depends on the specific core design and mission, and it can take the form of a variety of materials, such as metal alloys, ceramics, salts, or metal hydrides, or other compounds. The choice of suppressants and the mode of incorporating them will be done to be compatible with the reactor materials environment. Embodiments of the present invention will enable certain reactor types to achieve more aggressive fuel cycle missions that are not possible without the incorporation of specific suppressants.

Figure 3:
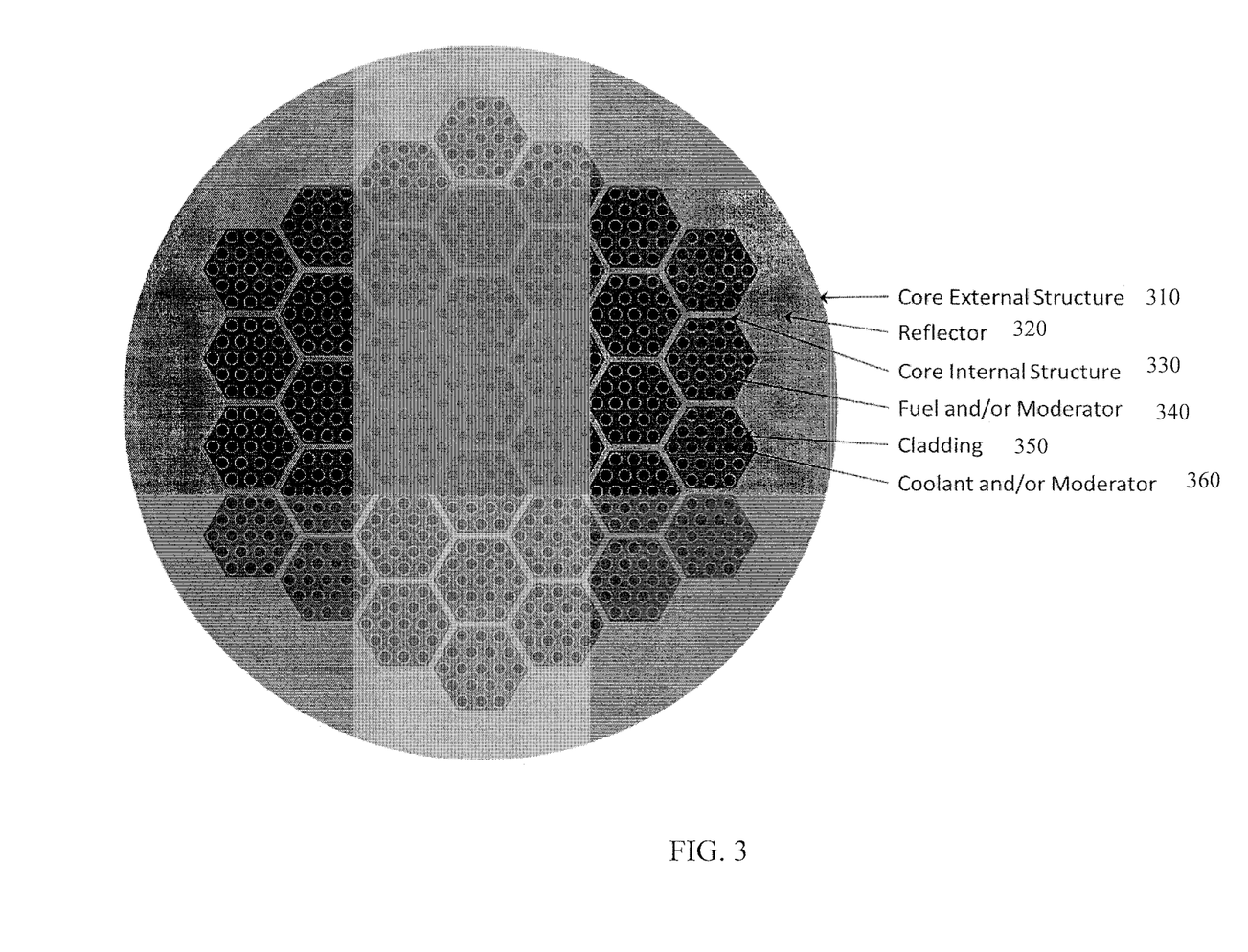
FIG. 3 is a top cross-sectional view of a nuclear reactor core, according to some embodiments of the present invention.

FIG. 3 is a top cross-sectional view of a nuclear reactor core, according to some embodiments of the present invention. FIG. 3 shows a core external structure 310, a reflector 320, a core internal structure 330 defining hexagonal (in this example) cells containing fuel and or moderator 340 and coolant and/or moderator 360, where the coolant and/or moderator may have cladding 350 separating the coolant/moderator from the fuel and/or moderator.

Figure 4:
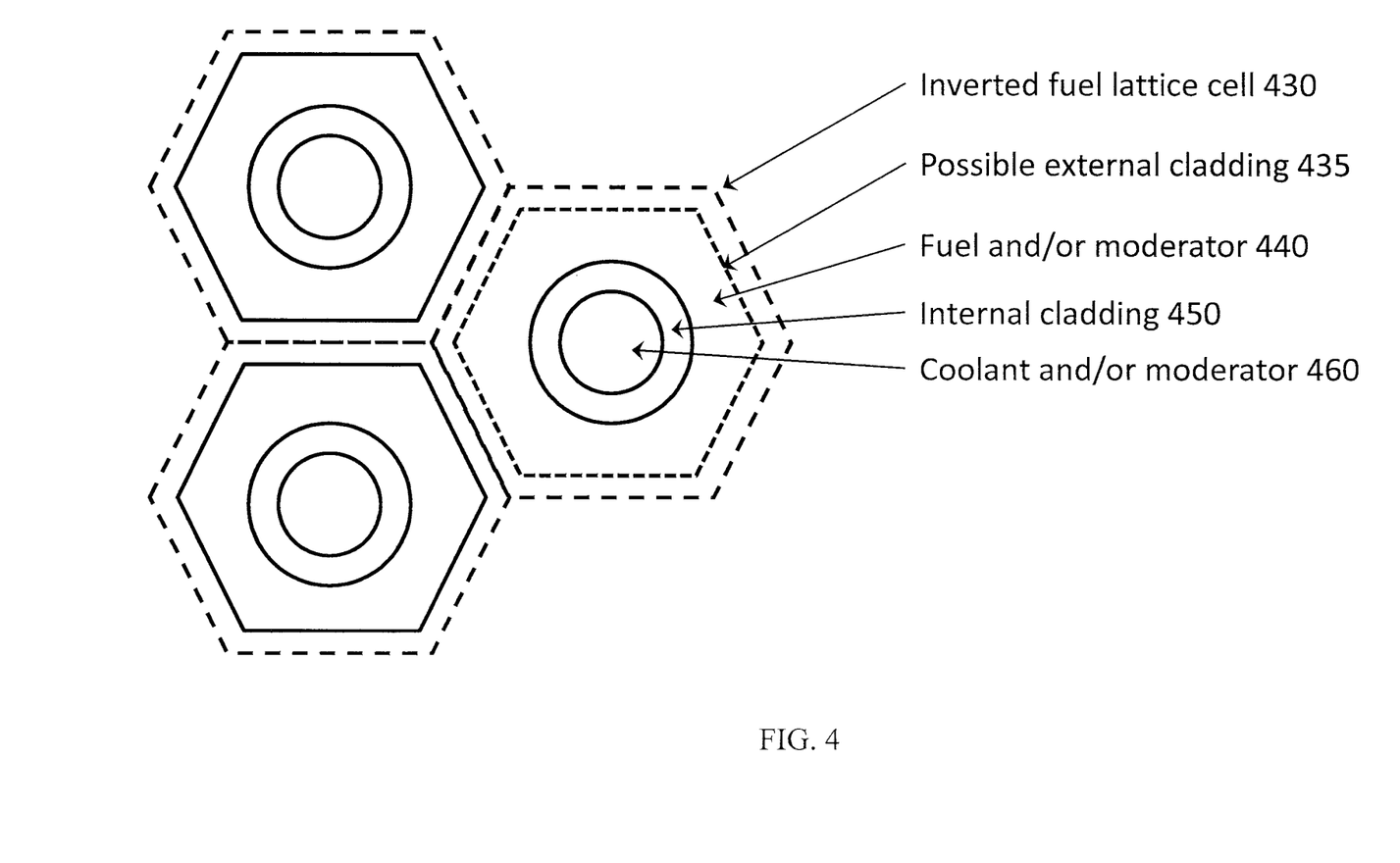
FIG. 4 is a cross-sectional detail of a nuclear reactor core arrangement in a first embodiment according to the present invention.

FIG. 4 is a cross-sectional detail of a nuclear reactor core arrangement in a first embodiment according to the present invention. FIG. 4 shows an inverted fuel lattice cell 430, in this example being a hexagonal cell containing an optional external cladding 435 around the periphery of each cell, fuel and or moderator 440, and coolant and or moderator 460 in the center of each cell, where the coolant and/or moderator has cladding 450 separating the coolant/moderator from the fuel and/or moderator.

Figure 5:
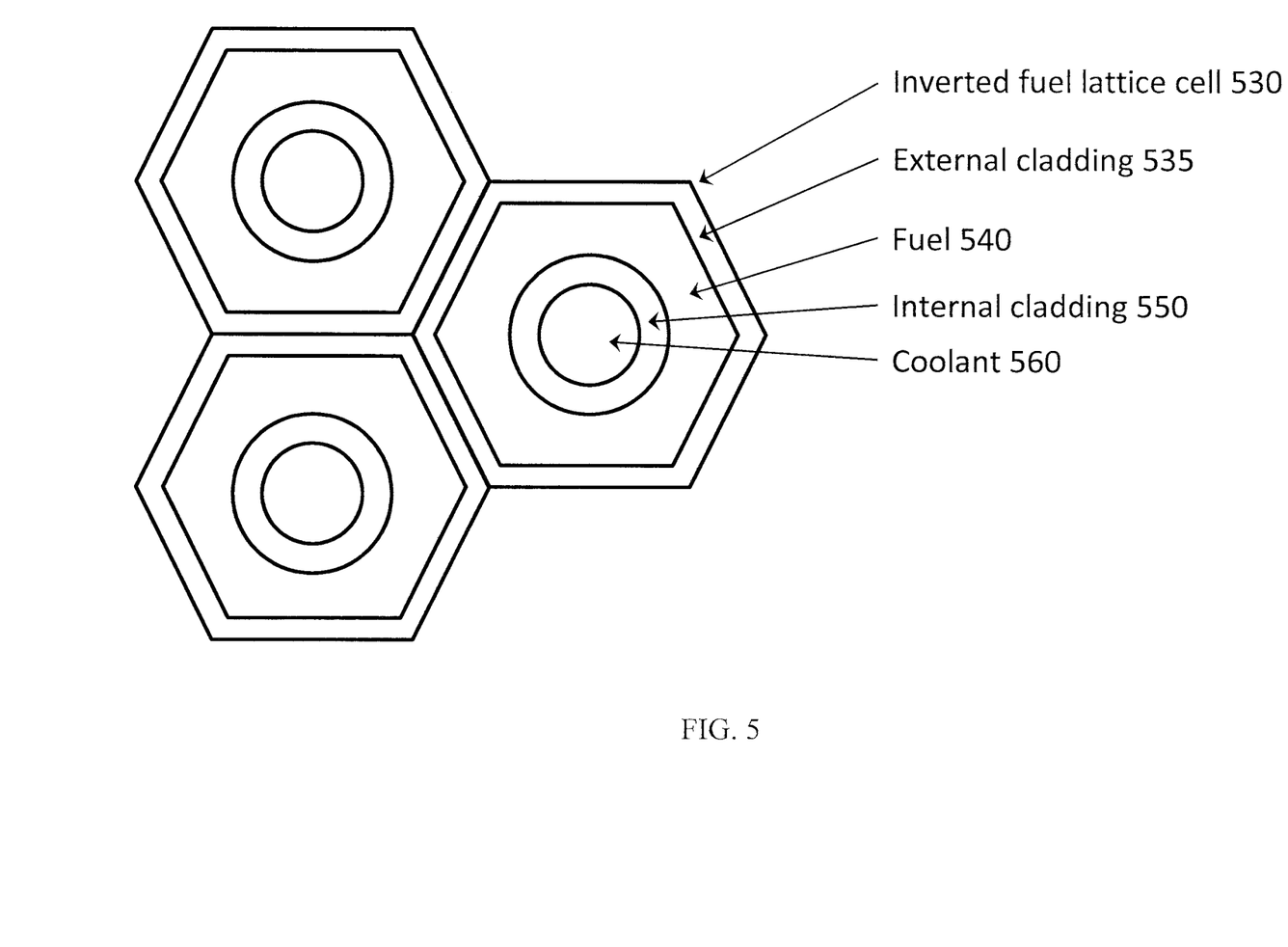
FIG. 5 is a cross-sectional detail of a nuclear reactor core arrangement in a second embodiment according to the present invention.

FIG. 5 is a cross-sectional detail of a nuclear reactor core arrangement in a second embodiment according to the present invention. FIG. 5 shows an inverted fuel lattice cell 530, in this example being a hexagonal cell containing an external cladding 535 around the periphery of each cell, fuel 540, and coolant 560 in the center of each cell, where the coolant has cladding 550 separating the coolant from the fuel.

Figure 6:
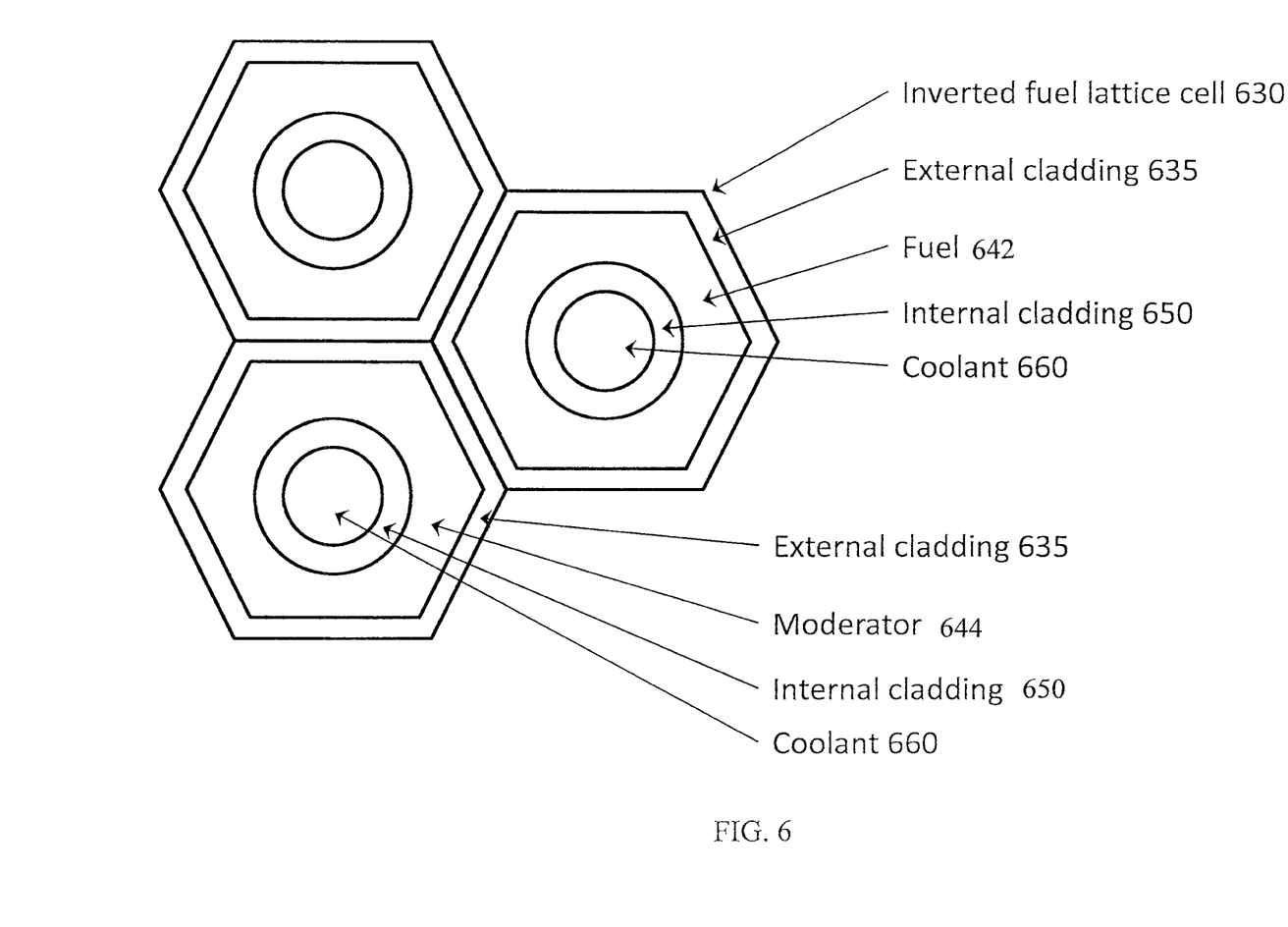
FIG. 6 is a cross-sectional detail of a nuclear reactor core arrangement in a third embodiment according to the present invention.

FIG. 6 is a cross-sectional detail of a nuclear reactor core arrangement in a third embodiment according to the present invention. FIG. 6 shows an inverted fuel lattice cell 630, in this example being a hexagonal cell containing an external cladding 635 around the periphery of each cell, one of fuel 642 or moderator 644, and coolant 660 in the center of each cell, where the coolant has cladding 650 separating the coolant from the fuel and moderator.

Figure 7:
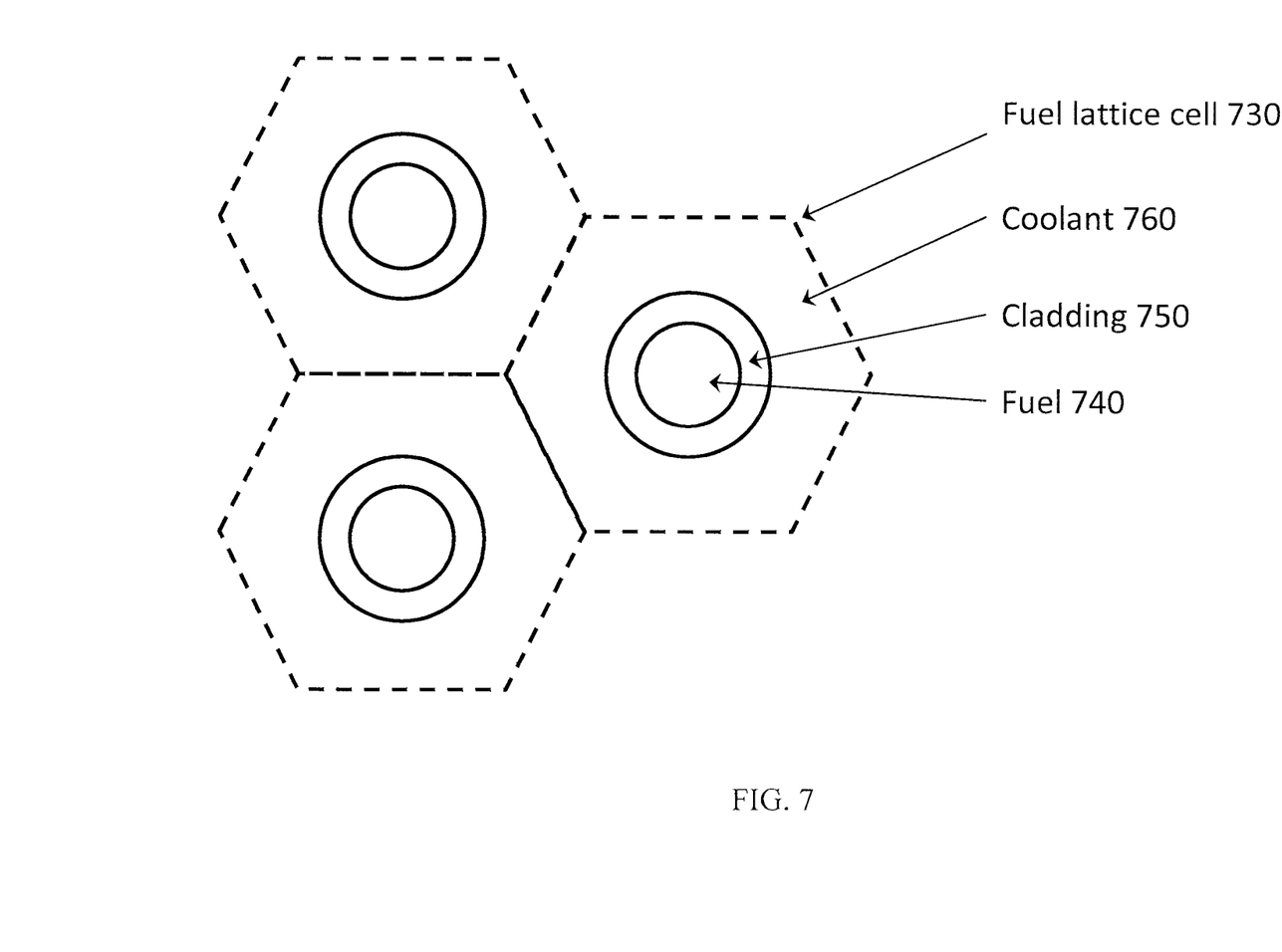
FIG. 7 is a cross-sectional detail of a nuclear reactor core arrangement in a fourth embodiment according to the present invention

FIG. 7 is a cross-sectional detail of a nuclear reactor core arrangement in a fourth embodiment according to the present invention. FIG. 7 shows a fuel lattice cell 730, in this example being a hexagonal cell containing coolant 760, and fuel 740 in the center of each cell, where the fuel has cladding 750 separating the coolant from the fuel.

Figure 8:
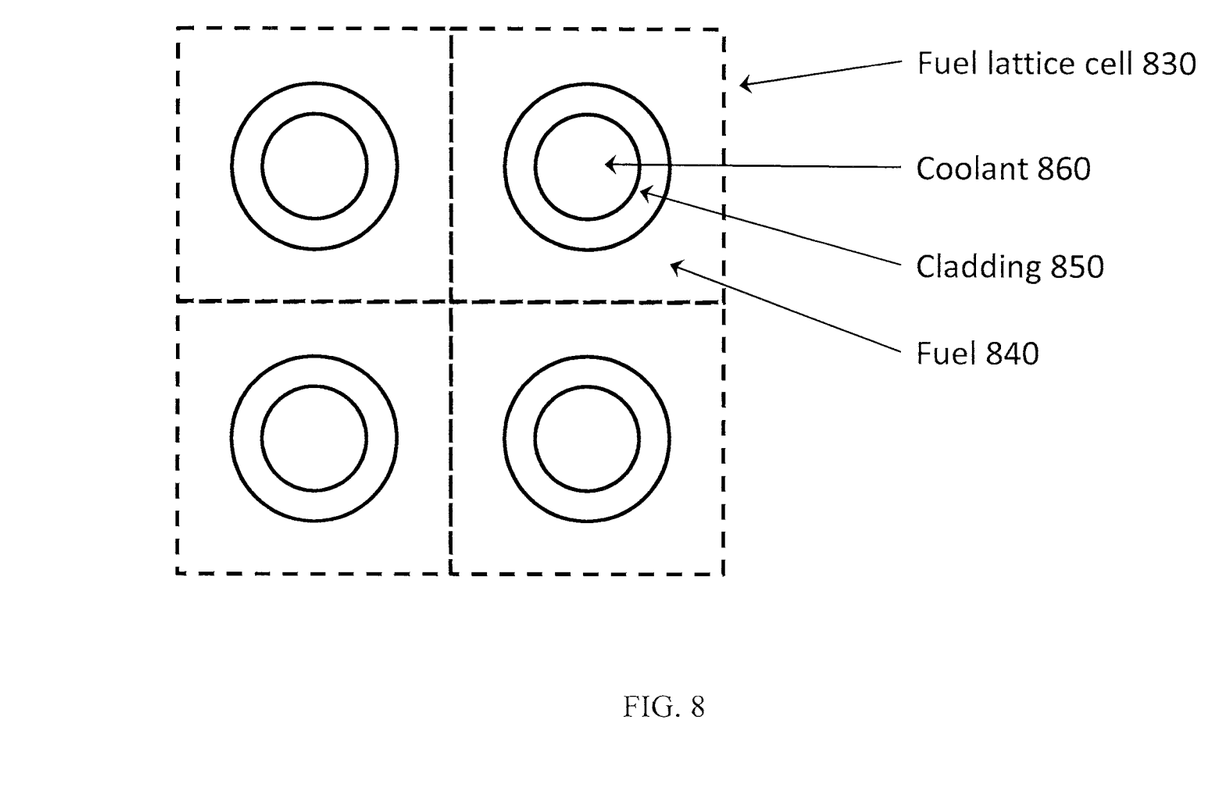
FIG. 8 is a cross-sectional detail of a nuclear reactor core arrangement in a fifth embodiment according to the present invention.

FIG. 8 is a cross-sectional detail of a nuclear reactor core arrangement in a fifth embodiment according to the present invention. FIG. 8 shows a fuel lattice cell 830, in this example being a square cell containing fuel 840, and coolant 860 in the center of each cell, where the coolant has cladding 850 separating the coolant from the fuel.

Figure 9:
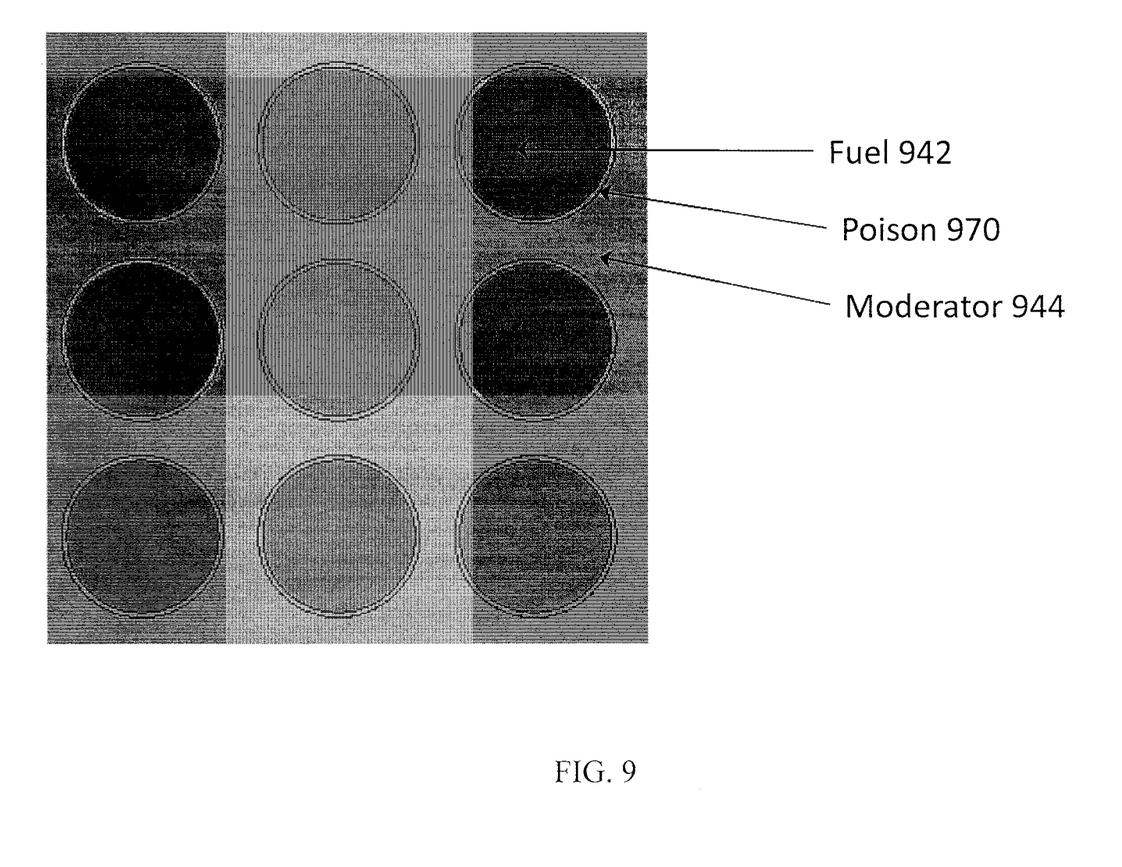
FIG. 9 is a cross-sectional detail of a nuclear reactor core arrangement in a sixth embodiment according to the present invention.

FIG. 9 is a cross-sectional detail of a nuclear reactor core arrangement in a sixth embodiment according to the present invention. FIG. 9 shows a simple cubic arrangement of circular cross-section fuel elements 942, the space between fuel elements being filled with moderator 944, where the fuel elements are separated from the moderator by a cladding of poison 970.

Figure 10:
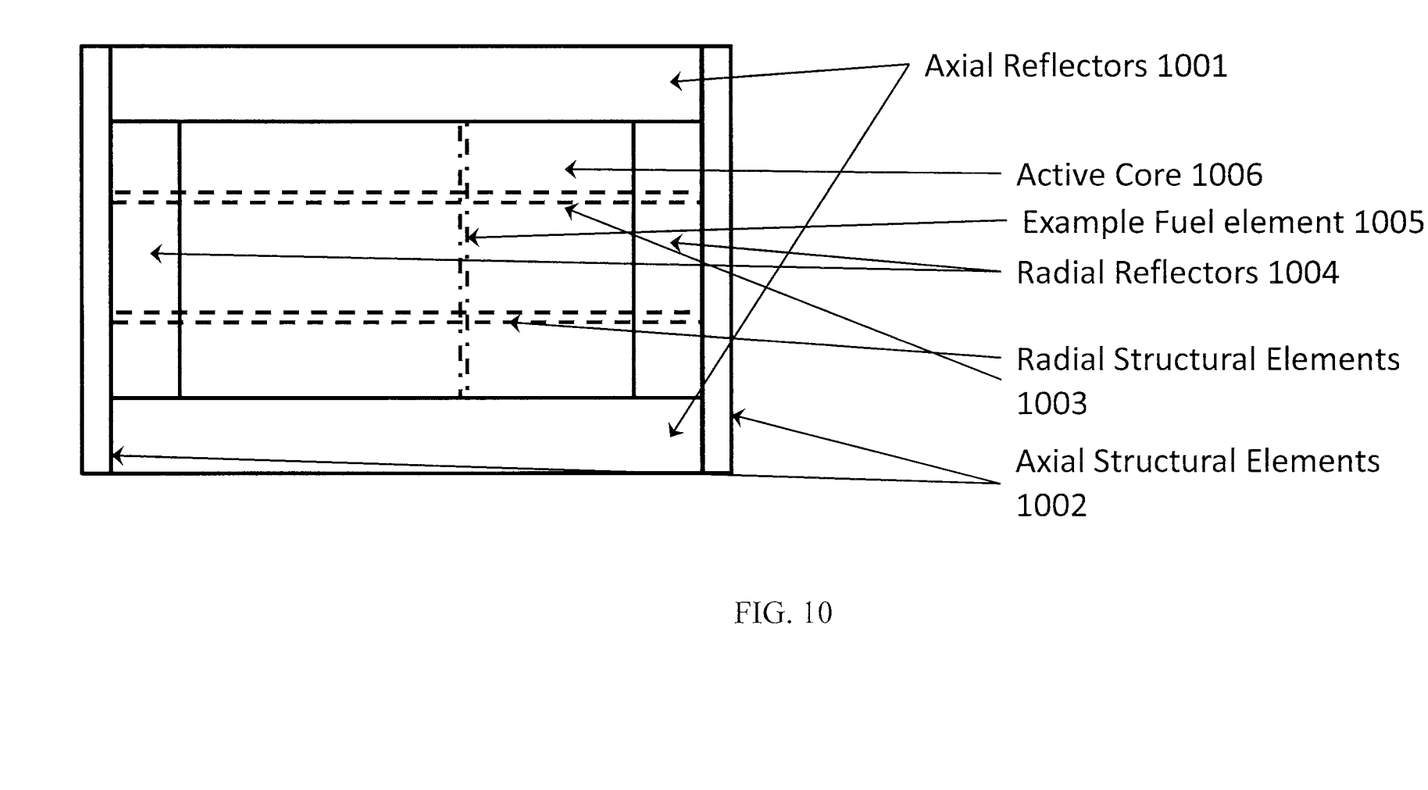
FIG. 10 is an axial profile view of a nuclear reactor core, according to some embodiments of the present invention.

FIG. 10 is an axial profile view of a nuclear reactor core, according to some embodiments of the present invention. FIG. 10 shows an active reactor core 1006 with axial neutron reflectors at top and bottom and radial neutron reflectors 1004 surrounding the active core in the horizontal planes. The active core 1006 comprises radial structural elements 1003, and a plurality of fuel elements 1005 aligned vertically.

Figure 11:
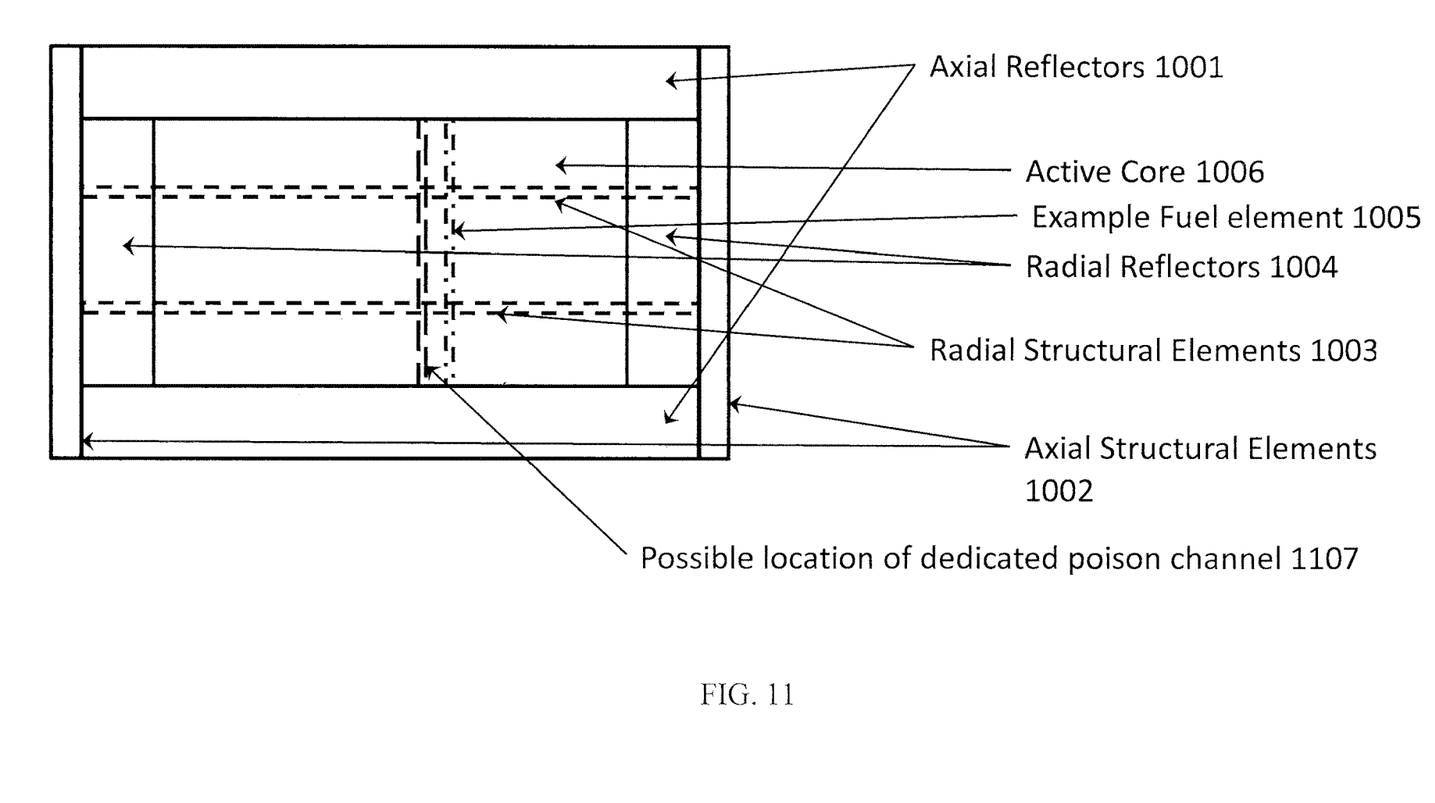
FIG. 11 is an axial profile view of a nuclear reactor core with an example of a dedicated poison/suppressant position, according to some embodiments of the present invention.

FIG. 11 is an axial profile view of a nuclear reactor core with an example of a dedicated poison/suppressant position, according to some embodiments of the present invention. FIG. 11 shows an active reactor core 1006 with axial neutron reflectors at top and bottom and radial neutron reflectors 1004 surrounding the active core in the horizontal planes. The active core 1006 comprises radial structural elements 1003, a plurality of fuel elements 1005 aligned vertically, and one or more dedicated poison channels 1107 aligned vertically—in this example a single dedicated poison channel 1107 is shown located centrally within the active core 1006.

Initial amounts of suppressant will vary based on a particular reactor core design, but will generally be on the order of a 0.1%-10% by weight in addition to the fuel, moderator, and coolant. This range may extend higher or lower, but the majority of instances that have been evaluated by the inventor to lie within the specified range. (An example of a lower range is less than or equal to 0.1 percent by weight in addition to the fuel, moderator, and coolant; and example of a higher range is greater than or equal to 10 percent by weight in addition to the fuel, moderator, and coolant.) The concentration of suppressant will depend on fuel cycle mission, desired core lifetime, and material compatibility constraints, among others.

Replenishment of suppressant can be achieved by mechanisms such as: load enough suppressant into the reactor with the fuel to last for the duration of the fuel lifetime, and replace upon refueling; use burnable poisons to sacrificially burnout instead of the suppressant; use a suppressant that self-sustains by replenishment due to irradiation at a fast enough rate to make up for its depletion under neutron irradiation; load suppressant into control elements that can be either replaced online, or follow rod movements to make up for depletion—e.g. the rod could have suppressant at varying axial heights that present themselves in varying concentrations throughout the life of the fuel elements; have replaceable fuel elements including the suppressant that can be replaced online; use a circulating fluid (liquid or gas) in dedicated channels where the concentration of suppressant can always be maintained (see FIG. 11); integrate the suppressants into a flowing coolant, moderator, and/or fuel so the concentration can be maintained via chemistry control systems.

Furthermore, it should be noted that the fuel does not have to start as plutonium, although the effect is more pronounced if that is the case. Instead, if sufficient plutonium is produced from the fuel (e.g. breeding from U-238), throughout the core lifetime such that the plutonium contributes significantly to the chain reaction (~20% or more of total fissions, although this can vary based on material configurations and ratios) at some point in the core life, these reactivity suppressant materials must be present at that point and for the duration of the core life to override the plutonium resonance phenomenon. In addition to the modes of suppressant incorporation described herein, a suppressant may in some embodiments be bred in the reactor core so as to be available to suppress the activity of bred Pu-239—for example, actinides Pa-232, U-233, U-235, Pu-240, Pu-241, Am-241, Am-242, or Cf-251 may be bred as suppressants.

EXAMPLES

The examples of different nuclear reactors set forth herein below are illustrative of different compositions and conditions that can be used in practicing the present embodiments. It will be apparent, however, that the present embodiments can be practiced with many types of compositions and configurations in accordance with the disclosure above and as pointed out hereinafter.

Example 1

Liquid Metal Cooled System

A liquid metal cooled system may be constructed with hydride moderator elements and/or fuel/hydride moderator elements with the suppressant neutron absorber placed in the fuel, hydride moderator, and/or alloyed with the cladding and/or structural elements of the core. For example, see FIG. 7. Examples of specific materials are as follows.

Coolant: Liquid sodium/potassium eutectic (NaK).

Fuel: U—Pu—$ZrH_{1.6}$ or U—Pu—Zr metal alloy with $ZrH_{1.6}$ moderator (suppressant can be added as erbium hydride); see Table 4 for an example of fuel composition.

Moderator: $ZrH_{1.6}$ (suppressant can be added as erbium hydride [$ErH_3$]); see Table 3 for an example of composition of moderator with added suppressant.

Cladding: SS-316 (suppressant can be alloyed with steel in small amounts ~0.1% to 1% by weight).

Structure: SS-304 (suppressant can be alloyed with steel in small amounts ~0.1% to 1% by weight).

Example 2

Heat Pipe Cooled System

A heat pipe cooled system may be constructed using alkali metals, water, halides, metals, and/or other suitable materials as the working fluid, with hydride moderator elements and/or fuel/hydride moderator elements with the suppressant neutron absorber placed in the fuel, the hydride moderator, and/or alloyed with the cladding and/or structural elements. However, the suppressant would most likely not be alloyed with the heat pipe material, only coated on the outside. For example, see FIGS. 3, 6 and 8. Examples of specific materials are as follows.

Coolant: Sodium.

Fuel: U—Pu—$ZrH_{1.6}$ or U—Pu—Zr metal alloy with $ZrH_{1.6}$ moderator (suppressant can be added as $ErH_3$); see Table 4 for example of fuel composition.

Moderator: $ZrH_{1.6}$ (suppressant can be added as $ErH_3$); see Table 3 for an example of composition of moderator with added suppressant.

Cladding: SS-316 (suppressant can be alloyed with steel in small amounts ~0.1% to 1% by weight).

Structure: SS-304 (suppressant can be alloyed with steel in small amounts ~0.1% to 1% by weight).

Example 3

First Liquid Salt Cooled System

A liquid salt cooled and fueled reactor may be constructed with hydride moderator elements with the absorber placed in the hydride moderator, dissolved in the fuel, and/or alloyed with the cladding and/or structural elements. For example, see FIGS. 3, 5 and 9. Examples of specific materials are as follows.

Coolant: Fluoride salt (e.g. LiF, FLiBe, NaFZrF, NaBeF) with additives and $ThF_4$, $UF_4$, and/or $PuF_3$ dissolved in the salt (suppressant can be dissolved in salt as $ErF_3$); see Table 5 for an example of fuel/coolant composition.

Fuel (same as coolant): Fluoride salt (e.g. LiF, FLiBe, NaFZrF, NaBeF) with additives and $UF_4$ and/or $PuF_3$ dissolved in the salt (suppressant can be dissolved in salt as $ErF_3$); see Table 5 for examples of fuel/coolant composition.

Moderator: $ZrH_{1.6}$ (suppressant can be added as $ErH_3$), or $ZrH_{1.6}$ mixed with graphite; see Table 3 for example of composition of moderator with added suppressant.

Cladding: SS-316, modified Hastelloy® N alloy, or SiC (suppressant can be alloyed in small amounts ~0.1% to 1% by weight, or coated onto the SiC).

Structure: modified Hastelloy® N alloy (suppressant can be alloyed in small amounts ~0.1% to 1% by weight).

Example 4

Second Liquid Salt Cooled System

A liquid salt cooled system may be constructed with hydride moderator elements and/or fuel/hydride moderator elements with the absorber placed in the fuel, hydride moderator, coolant, and/or alloyed with the cladding and/or structural elements. (Note in this example, a hydride moderator may be used in conjunction with a graphite moderator for certain neutron spectrum benefits.) For example, see FIGS. 7 and 8. Examples of specific materials are as follows.

Coolant: Fluoride salt (e.g. LiF, FLiBe, NaFZrF, NaBeF) (suppressant can be dissolved in salt as $ErF_3$).

Fuel: UCO and PuCO TRISO (tri-structural isotropic) fuels (suppressant can be added as $Er_2O_3$).

Moderator: $ZrH_{1.6}$ (suppressant can be added as $ErH_3$) and graphite; see Table 3 for example of composition of moderator with added suppressant.

Cladding: SS-316, modified Hastelloy® N alloy, or SiC, and graphite (suppressant can be alloyed in small amounts ~0.1% to 1% by weight, or coated or dispersed onto the SiC and graphite).

Structure: modified Hastelloy® N alloy (suppressant can be alloyed in small amounts ~1% by weight).

Example 5

Gas Cooled and Fueled System

A gas cooled and gas fueled reactor may be constructed with hydride moderator elements with the absorber placed in the hydride, and/or alloyed with the cladding and/or structural elements. For example, see FIGS. 3 and 9. Examples of specific materials are as follows.

Coolant: He mixed with $UF_6$ with $PuF_6$ vapor.

Fuel (same as coolant): $UF_6$ with $PuF_6$ vapor mixed with He gas.

Moderator: $ZrH_{1.6}$ (suppressant can be added as $ErH_3$ or dispersed as $Dy_{0.8}Er_{0.2}Al_2$); see Table 3 for example of composition of moderator with added suppressant.

Cladding: SiC (suppressant can be coated or dispersed onto the SiC).

Structure: modified Hastelloy® N alloy (suppressant can be coated on surface or dispersed as $Eu_2O_3$).

Example 6

Liquid Organic Cooled System

A liquid organic cooled system may be constructed with hydride moderator elements and/or fuel/hydride moderator elements with the absorber placed in the fuel, hydride moderator, and/or alloyed with the cladding and/or structural elements. For example, see FIG. 7. Examples of specific materials are as follows.

Coolant: Organic fluid (e.g. Syltherm™ available from Dow Corning Corporation).

Fuel: $UO_2$ and $PuO_2$ (suppressant can be added as $Er_2O_3$).

Moderator: Organic coolant and $ZrH_{1.6}$ (suppressant can be added as $ErH_3$); see Table 3 for example of composition of moderator with added suppressant.

Cladding: SS-316 (suppressant can coat steel in small amounts ~0.1% to 1% by weight).

Structure: Carbon steel (suppressant can be alloyed with steel in small amounts ~0.1% to 1% by weight).

Example 7

Molten Fuel Cooled Reactor

A molten fuel (molten fuel material, not necessarily a dissolved fuel) cooled and fueled reactor may be constructed with hydride moderator elements with the suppressant absorber placed in the hydride, in the fuel, and/or alloyed with the cladding and/or structural elements. For example, see FIG. 4. Examples of specific materials are as follows.

Coolant: Molten plutonium metal.

Fuel (same as coolant): Molten plutonium metal (suppressant could be dissolved in molten fuel or alloyed, depending on mission of reactor).

Moderator: $ZrH_{1.6}$ (suppressant can be added as $ErH_3$); see Table 3 for example of composition of moderator with added suppressant.

Cladding: Tantalum alloys (Ta is a poison).

Structure: Tantalum or niobium alloy (Ta is a poison and other poisons can be alloyed in small amounts ~0.1% to 1% by weight).

Although embodiments of the present disclosure have been particularly described with reference to certain embodiments thereof, it should be readily apparent to those of ordinary skill in the art that changes and modifications in the form and details may be made without departing from the spirit and scope of the disclosure.

TABLE 3

Composition of $ZrH_{1.6}$ Moderator with $ErH_3$ Suppressant

| Element | Weight % |
| --- | --- |
| Zr | 96.359% |
| H | 2.658% |
| Er | 0.982% |

TABLE 4

Composition of U-Pu-$ZrH_{1.6}$ Fuel

| Element/Isotope | Weight % | Weight % Actinides |
| --- | --- | --- |
| Pu-239 | 9.618% | 19.00% |
| U-238 | 41.003% | 81.00% |
| Zr | 48.528% | |
| H | 0.851% | |

TABLE 5

Composition of NaFZrF-TRUF Fuel Salt with $ErF_3$ and $CdF_2$

| Element/Isotope | Weight % | Weight % Actinides |
| --- | --- | --- |
| Na | 10.3042% | |
| Zr | 40.7689% | |
| F | 45.0422% | |
| Er | 0.3689% | |
| Np-237 | 0.1565% | 4.570% |

TABLE 5-continued

Composition of NaFZrF-TRUF Fuel Salt with $ErF_3$ and $CdF_2$

| Element/Isotope | Weight % | Weight % Actinides |
|---|---|---|
| Pu-238 | 0.0526% | 1.536% |
| Pu-239 | 1.9444% | 56.782% |
| Pu-240 | 0.7974% | 23.287% |
| Pu-241 | 0.2292% | 6.693% |
| Pu-242 | 0.1798% | 5.251% |
| Am-241 | 0.0136% | 0.397% |
| Am-242 | 0.0003% | 0.009% |
| Am-243 | 0.0389% | 1.136% |
| Cm-243 | 0.0001% | 0.003% |
| Cm-244 | 0.0111% | 0.324% |
| Cm-245 | 0.0004% | 0.012% |
| Rb | 0.0229% | |
| Cd | 0.0229% | |
| Sn | 0.0228% | |
| Cs | 0.0229% | |

What is claimed is:

1. A nuclear reactor core comprising:
nuclear fuel comprising Pu-239;
a neutron moderator which behaves as an Einstein oscillator and as the temperature of the reactor increases said neutron moderator increases the energy of thermal neutrons into a Pu-239 neutron absorption resonance; and
a neutron absorbing element with neutron absorption of 0.3 eV added to said nuclear reactor core, wherein
said neutron absorbing element is different from a burnable poison used in the nuclear reactor core,
said neutron absorbing element was added upon fueling the nuclear reactor core in an amount calculated to suppress, at any time during the life of the fuel, a reactivity gain with temperature due to said neutron moderator increasing the energy of thermal neutrons into a neutron absorption resonance of said Pu-239.

2. The nuclear reactor core of claim 1, wherein said neutron moderator comprises ZrHx, where x is between 1.5 and 1.7.

3. The nuclear reactor core of claim 1, wherein said neutron moderator comprises $YH_2$.

4. The nuclear reactor core of claim 1, wherein said neutron moderator comprises $TiH_2$.

5. The nuclear reactor core of claim 1, wherein said neutron moderator comprises $ThH_2$.

6. The nuclear reactor core of claim 1, wherein said Pu-239 is 0.4 weight percent or more of said nuclear fuel.

7. The nuclear reactor core of claim 1, wherein said Pu-239 is in the range of 0.1 to 1.0 weight percent of said nuclear fuel.

8. The nuclear reactor core of claim 1, wherein said neutron absorbing element is erbium.

9. The nuclear reactor core of claim 1, wherein said Pu-239 is in the range of 1.0 to 5.0 weight percent of said nuclear fuel.

10. The nuclear reactor core of claim 1, wherein said Pu-239 is in the range of 5.0 to 10.0 weight percent of said nuclear fuel.

11. The nuclear reactor core of claim 1, wherein said Pu-239 is in the range of 10.0 to 20.0 weight percent of said nuclear fuel.

12. The nuclear reactor core of claim 1, wherein said Pu-239 is in the range of 20.0 to 100.0 weight percent of said nuclear fuel.

13. The nuclear reactor core of claim 1, wherein said neutron absorbing element has an absorption cross section of at least 100 barns.

14. The nuclear reactor core of claim 1, wherein said neutron absorbing element has an absorption cross section of at least 500 barns.

15. The nuclear reactor core of claim 1, wherein said neutron absorbing element has an absorption cross section of great than 1000 barns.

16. A method of controlling a nuclear reactor comprising:
providing nuclear fuel comprising Pu-239 in a core of the nuclear reactor;
providing a neutron moderator which behaves as an Einstein oscillator and as the temperature of the nuclear reactor increases said neutron moderator increases the energy of thermal neutrons into a neutron absorption resonance of said Pu-239; and
adding a neutron absorbing element with neutron absorption of 0.3 eV to said core, wherein
said neutron absorbing element is different from a burnable poison used in the core,
said neutron absorbing element is added upon fueling the nuclear reactor core in an amount calculated to suppress, at any time during the life of said nuclear fuel, a reactivity gain with temperature due to said neutron moderator increasing the energy of thermal neutrons into said neutron absorption resonance of said Pu-239.

* * * * *